June 3, 1941.  R. E. BENSON  2,244,383
PROCESS FOR PREPARING SILICEOUS BASE EXCHANGE SUBSTANCES
Filed Sept. 11, 1939
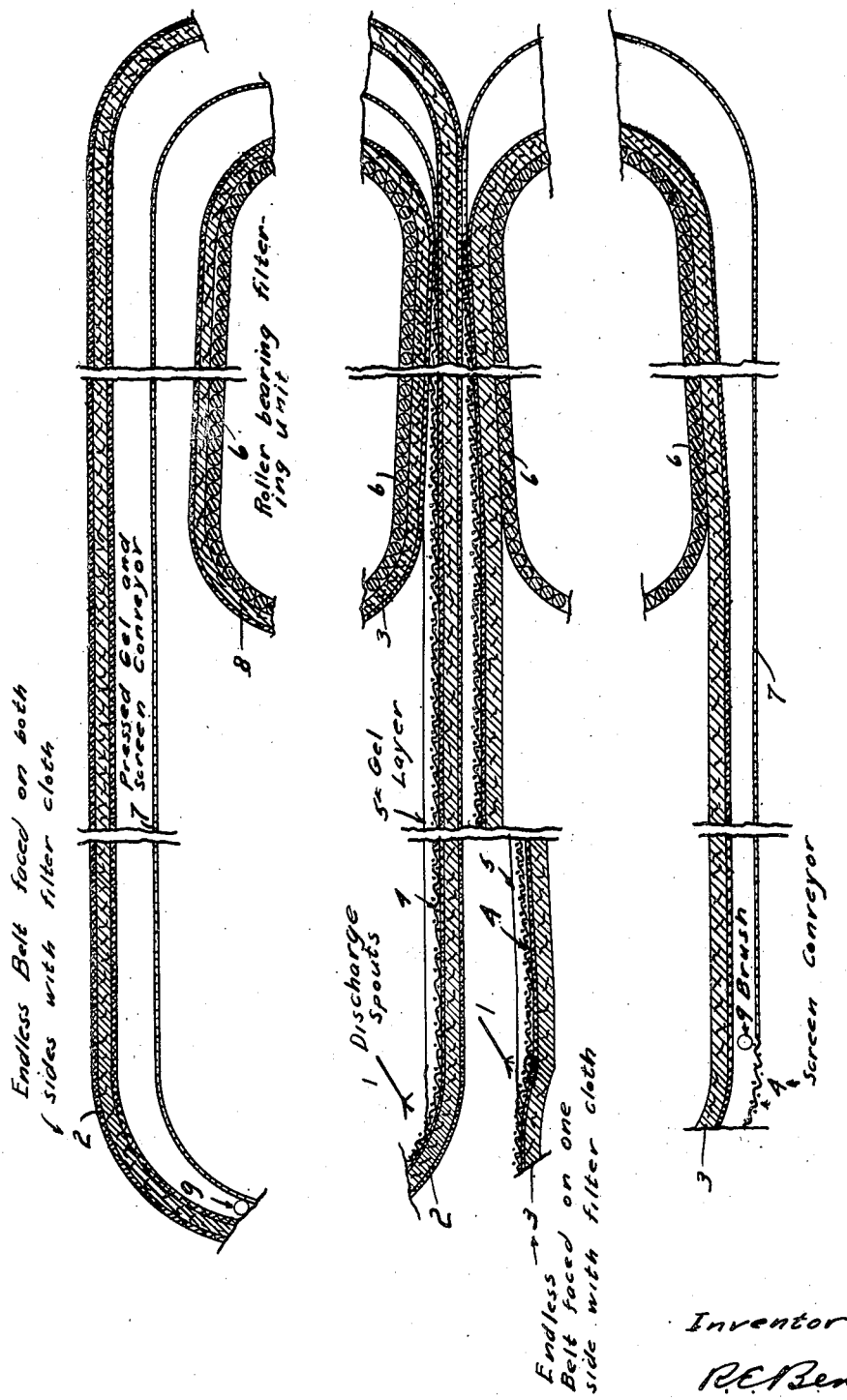
Inventor
R. E. Benson Patented June 3, 1941

2,244,383

UNITED STATES PATENT OFFICE 2,244,383

PROCESS FOR PREPARING SILICEOUS BASE EXCHANGE SUBSTANCES

Richard Ernest Benson, Buffalo, N. Y.

Application September 11, 1939, Serial No. 294,320

4 Claims. (Cl. 23—113)

My invention relates to artificial minerals of the base-exchange type, one use of which is for softening water, and it has particular reference to a process for producing the same.

While artificial minerals of this type are now well known and used, the objections to the commercial methods of manufacturing these gel-type zeolites are many. In making them, an aluminosilicate gel is first prepared by mixing dilute solutions of sodium silicate and a soluble aluminum salt, which sets more or less rapidly to a gel containing a relatively large quantity of water. In one process the water is removed by evaporation at relatively low temperatures which obviously requires a large amount of heat, considerable time and a relatively large amount of process equipment. The mineral must then be reduced to a suitable size by one means or another and this results in the production of a considerable amount of fines. As drying trays are used, the labor costs are also relatively high. Another process removes a portion of the excess water by subjecting the gel or its resulting filter cake to a temperature sufficiently low to cause the whole to freeze. Upon thawing the water drains away and the remaining material is then generally subjected to a drying treatment to improve its physical properties. Though by careful regulation and control of the freezing operation, a mineral can be made by this process that does not require crushing, there is a relatively large amount of fines produced. In a third process, the solution resulting from mixing dilute alkaline solutions containing silica and alumina is poured on concrete paving. Here the solution sets to a gel and in the course of several days it drys. It is apparent that with varying weather conditions the product cannot be uniform. Also, this process is seasonal and requires that a year's supply of mineral be made during the summer months. This necessitates a large storage space and a large capital investment in stock on hand. In the various processes for producing minerals of this type, the dried product is washed with water to remove the excess alkali.

I have therefore aimed to provide a method of manufacturing a mineral of greater capacity and at a lower cost than known in the prior art.

Another object of my invention is to provide a mineral which will withstand drying and rewetting a considerable number of times without noticable decrepitation.

I have also aimed to provide a process for the preparation of artificial minerals wherein the proportion of fine particles formed is substantially less than in processes heretofore known.

Another object of my invention is the provision of a process for the preparation of artificial minerals which contain a relatively small portion of excess alkali which must be removed by washing.

A further object of my invention is the provision of a process for the preparation of artificial minerals resulting in a mineral of greater uniformity and one which possesses greater strength, which is more rugged, and which is more resistant to the action of aggressive waters.

Another object of my invention is the provision of a process for the preparation of artificial minerals resulting in a product the particles of which, without crushing, are of such size as to satisfy the market and which at the same time results in the formation of only a small percentage of fines.

These and other objects will be better understood as I describe my invention.

In the preparation of artificial minerals it has heretofore been the practice to remove the free water from the gel either by drying or by freezing the gel, thawing and then generally drying the product. In some instances the gel has been broken up and filter-pressed to remove part of the free water before removing more water by freezing and/or drying. In either case the material as it came from the filter press was of no commercial value as such. These have been expensive and relatively slow processes which required a large outlay in equipment and considerable amount of labor. In addition, only a fraction of the mineral obtained was of commercial size and the larger particles had to be reduced to a suitable size and all the fines discarded. I have found however that a mineral may be prepared at a substantial reduction in cost and improvement in the quality by the continuous process about to be described. I have further discovered that the mineral possesses a higher exchange capacity than the commercial products because of the uniform conditions that can be easily maintained throughout each step to produce a mineral with the highest exchange capacity relative to its composition. In addition, I have discovered that by means of a metallic screen, or its equivalent, which serves as a conveyor, the continuously filtered gel can be easily removed from the filtering cloths and subjected to the first drying stage. It has also been found that by regulating the total solids per unit area, a product of any desired commercial size can be obtained. The size and uniformity of the resulting mineral entirely obviates any necessity for crushing the larger particles though if an accurately graded mineral is desired, some method of classification may be resorted to.

My invention consists in a general way in the preparation of a sodium (or its equivalent) containing hydrated silicate of alumina gel in sheet form by any of the well known methods. Such a gel may be satisfactorily prepared by admixing solutions of sodium silicate and of sodium aluminate in suitable proportions and letting the resulting solution set to a gel of the desired thickness upon a belt upon which a screen-like conveyor has been superimposed. The resulting gel is then subjected to continuous filtration during which a large portion of the excess alkaline liquor is removed. The residue consists of a sheet of mineral the moisture content of which depends, among other variables, upon the conditions of filtration and the solids per unit area. This filtered sheet, in which a screen-like conveyor has been incorporated, may be continuously dried (or first continuously washed in sheet form and then dried) and removed from the carrier by a revolving brush. An alternate and preferred procedure consists of removing a portion of the remaining water by drying, dislodging the partly dehydrated mineral from the screen-like conveyor, washing it, and finally drying the mineral to a predetermined moisture content in a second continuous dryer.

While numerous alterations may be made in my method of manufacture of this superior mineral, preferred examples, given by way of illustration, are set forth.

In my process I choose for my raw materials, sodium aluminate and sodium silicate. In actual practice I can use any of the commercial products which are supplied by the manufacturers of these commodities. Sodium aluminate is now supplied in the open market as an almost C. P. product with the formula $Na_2Al_2O_4$, having less than two per cent of excess caustic and as little as eight per cent moisture. I have found that I can satisfactorily use this product as well as commercial products containing a considerable amount of insoluble matter and that it has some advantages over the commercial solutions on the market: one advantage is that a gel of higher solid content can more satisfactorily be made. However in this illustration I have used a solution of sodium aluminate obtained by dissolving 19.2 parts of caustic in 30 parts of water, adding 32 parts of hydrate of alumina, heating until solution has occurred, and diluting by the addition of 35 parts of water. This material will be used in my illustrations as the sodium aluminate raw material, although it should be understood that I am not limited to this particular composition, but that by proper admixture of water I can use any of the commercial brands on the market including the solid materials as well as other soluble compounds of aluminum.

For sodium silicate, most of the commercial brands on the market are satisfactory. As an illustration of the kind that I use, although very satisfactory but not necessarily the only silicate that can be used, I use a solution of sodium silicate which consists of 24.7 per cent $SiO_2$, 6.4 per cent $Na_2O$, and the rest water.

With these two substances as a starting point, I make up a solution containing from 0.08 to 0.14 mol of sodium aluminate per liter and another solution of sodium silicate of such concentration that, when equal volumes of the two solutions are admixed, the ratio of $SiO_2:Al_2O_3$ will vary between two and eight. It is to be understood that equal volumes of the two solutions need not be used but for convenience are used in this illustration. Likewise wider ratios of $SiO_2:Al_2O_3$ than 2:1 to 8:1 may be used. It is also possible to use a wider range of sodium aluminate concentration but if a lower concentration is used, the increase loss of reactants in the filtrate and the decrease in the amount of product obtained per unit of volume handled offsets the other advantages while an increase in concentration above 0.14 mol per liter further increases the difficulties of obtaining good mixing of the solutions before gelation occurs.

The operation of my invention will better be understood by reference to the following description taken in connection with the drawing in which I have schematically indicated a portion of an apparatus whereby my invention may be carried into effect. This schematic drawing illustrates a duplex operation of my invention.

A specific illustration of a quite satisfactory method of continuously forming a gel is: A concentrated solution of sodium aluminate of the composition previously described is made. As needed this solution is continuously mixed with sufficient water to produce a 0.1 molar solution of alumina of uniform texture. In a similar manner the silicate of soda solution specified above is continuously admixed with sufficient water to produce a solution 0.5 molar with respect to silica. Immediately these two dilute solutions are thoroughly admixed in equal volumes in a mixing chamber to form a uniform solution and continuously discharged through spouts I upon endless belts 2 and 3 moving at such a rate that a gel layer of predetermined thickness, 8 mm. for example, is obtained when the solution sets. Belt 2 differs from belt 3 in that the former is faced on both sides with filter cloth and the latter is faced only on the upper side. The provision of a filtering medium on the underside of belt 2 is not absolutely necesary but highly desirable. By having a screen-like conveyor 4 moving at the same speed upon each of the respective belts, it is incorporated in the gel. The screen-like conveyors 4 may be common 6, 8, 10 or 12 mesh soft steel screen the wire diameter of which may be approximately 0.028 inch, or the conveyor may be a more complicated and expensive spiral weave screen with an extra large percentage of open area.

The two gel layers 5 which form around the two screens shortly after the two solutions are mixed are carried upon the conveyor belts 2 and 3 through the filtering unit 6, 6 where a large portion of the mother liquor is removed. Until the two layers or sheets of gel are brought into contact with one another, the lower layer of gel is supported by belt conveyor 3 and the upper layer of gel is supported by belt conveyor 2. When the layers of gel are subjected to dehydration by being passed through the filtering unit, belt conveyor 3 actually supports both layers of gel but the two layers of gel are separated by belt conveyor 2 which facilitates dehydration by virtue of being faced on each side with filter cloth. The filtering unit may consist of two roller races, a large number of sets of rollers, a Kutztown roller press, or the equivalent, so arranged that the clearance between the upper rollers and the lower rollers continuously decrease so as to cause a continually increasing pressure to be exerted on the gel layers as they pass through the unit. The pressure of the upper rollers is transmitted to the upper gel layer 5 through a belt 8 which is faced with filter cloth or other filtering medium and thus differs from belt 3 only in length. It has been found that if the pressure is not increased too rapidly, there is little tendency for the gel to extrude from the sides. By so forming the gel layers that they are one to two inches less in width than the belts 2 and 3 and conveyors 4, that is, provide a ½ to 1 inch border on each side, there is practically no loss of gel from extrusion from the sides.

On leaving the filtering unit the screen conveyors and belts are separated (means of accomplishing this not shown) and the conveyors, each carrying a sheet of filtered gel 7, pass through drying units (not shown) where they are subjected to the drying action of air at a temperature preferably less than 212° F. On emerging from this first drying stage the partly dried mineral is dislodged from the screens by revolving brushes 9 after which the screen-like conveyors continue in their cycle. Because the pressed gel undergoes a marked shrinkage during drying and because this shrinkage causes the pressed dehydrated sheet to disintegrate into small particles, the revolving brushes easily dislodge the dried mineral either by directly striking the particles or by striking the screen the resulting vibration of which dislodges the mineral. The dislodged product may discharge directly into hoppers or onto conveying belts which carry the mineral to any desired point. (Receiving bins or conveyors for the dried zeolite are not shown.)

To the casual observer, as well as to those experienced in the art, the time lapsing between mixing and dehydrating should be only sufficient to permit the gel to set well so as to reduce the the floor space required. However, an analysis of the filtrate after varying time intervals between mixing and filtering shows that there is one most economical time of filtering for a given cost of the raw materials because practically all the silica precipitates shortly after the two solutions are mixed and then starts to redissolve whereas, under these conditions, the alumina comes out more slowly. The following table, Table 1, give the necessary data for plotting curves showing the concentration of both silica and alumina in the filtrate at any given time between 5 and 40 minutes of ageing of the gels.

TABLE 1

| Ratio SiO₂ : Al₂O₃ in product | Mols Al₂O₃ in filtrate | Mols SiO₂ in filtrate | Time of ageing in minutes |
|---|---|---|---|
| 5.52:1 | .0106 | .0065 | 5 |
| 5.37:1 | .0082 | .00683 | 10 |
| 5.00:1 | .0036 | .0178 | 20 |
| 4.69:1 | .0012 | .0372 | 40 |

From the market price of the raw materials it is a simple matter to determine the most economical time of ageing. Assuming the delivery cost of sodium silicate is $1.00 per hundred and that sufficient caustic and hydrate of alumina for 100 pounds of sodium aluminate is delivered at $4.50, the relative value of the loss of both silica and alumina as well as the value of the total loss is given approximately in Table 2.

TABLE 2

*Relative value of loss in filtrate at various times*

| Time in minutes | SiO₂ | Al₂O₃ | Total |
|---|---|---|---|
| 10 | 16.5 | 59.10 | 75.60 |
| 12 | 20.17 | 50.20 | 70.37 |
| 14 | 24.27 | 42.10 | 66.37 |
| 16 | 29.95 | 35.50 | 64.45 |
| 18 | 35.20 | 29.60 | 64.80 |
| 20 | 40.60 | 26.60 | 67.20 |
| 25 | 53.50 | 20.70 | 74.20 |
| 30 | 67.30 | 14.80 | 82.10 |

A curve based upon the values given in the last column of Table 2 indicates that if a filtering time of four minutes is employed, dehydration should be commenced 15 minutes after the two solutions have been mixed. Referring to the first column of Table 1 it will be observed that under these conditions of operation the ratio of $SiO_2:Al_2O_3$ in the product will be slightly greater than 5.1:1.

The filtrate is discarded while the pressed sheets of partially dehydrated gel are carried by the incorporated screens through driers where the mineral is dried sufficiently to permit its removal. A dry bulb temperature below 212° F. and a wet bulb temperature above 85° F. have been found satisfactory though this process is not limited to this range. After the partially dried mineral has been dislodged from the conveyors, it is washed. It is to be noted that the mineral as it comes from the screen conveyors is of such particle size that when dehydration is completed, it is in a quite satisfactory marketable condition without having to resort to screening or crushing. As there is apparently some benefit in ageing the partly dried material before washing, I prefer to provide a hopper of sufficient capacity to give the mineral a two hour ageing before washing. It is to be noted that since a large amount of the excess alkali appeared in the filtrate, much less wash water is required than if the original gel had been dried and then washed. It is to be understood that washing is not an operation necessary to the production of a mineral of high capacity but is included in this illustration in order to produce a mineral with low excess alkali.

The partly dehydrated, washed mineral is then further dehydrated in a continuous drier to a predetermined moisture content approximately equal to that of the present commercial high capacity zeolites. Though higher temperatures have been found satisfactory, I prefer to use air with a dry bulb temperature less than 150° F. for the second drying. It is to be particularly noted in the above illustration that final dehydration was completed after the mineral had been removed from the screen conveyors. It has been found that an even more rugged mineral is obtained if during final dehydration, the small particles are permitted to contract freely in all directions. Also, the smaller extent of decrepitation of the mineral on wetting is due to the drying of small, fairly uniform particles. The fact that particles of zeolite below a certain size decrepitated very little has been observed by other investigators but previously no method had been developed utilizing this important observation. For these reasons two stage drying is preferred though a very satisfactory mineral is obtained when the mineral is dehydrated to its final moisture content while still on the conveyors.

The above described illustration produces a zeolite of greater exchange capacity than the commercial minerals of the same composition now on the market because the mineral is hand-picked so to speak by virtue of the close uniform control than can be maintained over each step of the process. In addition the mineral is of better particle size because I have found that by controlling certain variables I can obtain directly a mineral of any commercially desirable screen analysis without resorting to crushing the larger particles and without screening out an excessive amount of fines. For example, by properly controlling the variables discussed below, minerals of the following screen analysis have been obtained directly without crushing.

| Sample number | Screen analysis, percent retained on the various screens | | | | | | |
|---|---|---|---|---|---|---|---|
| | 10 | 14 | 20 | 28 | 35 | 48 | -- |
| 1 | 54.0 | 26.7 | 11.6 | 4.76 | 1.59 | .53 | .90 |
| 2 | 31.4 | 31.0 | 22.6 | 8.6 | 3.35 | 1.08 | 1.03 |
| 3 | 8.6 | 31.4 | 34.0 | 15.6 | 5.8 | 1.9 | 1.9 |
| 4 | 14.5 | 34.3 | 30.4 | 13.26 | 4.83 | 1.35 | 1.21 |

I have found that the following variables effect the screen analysis of the product:

1. The amount of mineral per unit area of the screen-like conveyors which in turn is dependent upon:
   a. Thickness of the gel layer.
   b. Composition of the gel.
2. The pressure and time employed during filtration.
3. Amount of drying.
4. Screen mesh and wire size of conveyor I have found a gel thickness of 4 to 10 mm. quite satisfactory for gels of the composition described in the preceding illustrations. With all other conditions constant, the size of the particles generally increase with the thickness of the pressed layers. The effect of the mesh of the screen on the particle size is most pronounced when the screen thickness is nearly equal to the thickness of the filtered gel layer and when the dimension of the openings is approximately the same as the thickness of the gel layer after filtering. The diameter of wire may be increased without increasing the thickness of the screen by using rolled wire cloth. Both types of screens have proven satisfactory.

I have found that the capacity of my mineral varys with its alumina content: the lower the ratio of $SiO_2:Al_2O_3$ the higher the exchange capacity. Since the majority of the high capacity synthetic minerals on the market have the approximate composition of $Na_2O.Al_2O_3.5SiO_2.xH_2O$, I have made a mineral of approximately this composition in my illustrations.

It will be seen from the foregoing that I have provided a new and novel method for the preparation of artificial base-exchange substances wherein the cost of manufacture is materially reduced and the quality of the product is substantially increased. The mineral is harder and less susceptible to abrasion and decrepitation than similar minerals of the prior art and consequently have a longer operating life than the prior minerals. It is also seen that I have provided a method of producing a mineral of more uniform size and quality and of higher exchange capacity than that known of minerals of similar composition in the prior art.

While I have thus described and illustrated my invention, I am aware that numerous alterations and changes may be made therein without materially departing from the spirit of the invention or the scope of the appended claims.

What I claim is:

1. The method of producing siliceous base-exchange substances consisting in continuously forming a thin sheet of hydrated alumino-silicate around a screen-like conveyor which is supported by a continuous filtering web, continuously pressing the gel at a predetermined time after the gel has formed, further dehydrating the mineral to a satisfactory moisture content by drying while it is still on the screen like conveyor, and dislodging it from the screen conveyor.

2. The method of producing siliceous base-exchange substances consisting in continuously forming a thin sheet of hydrated alumino-silicate gel around a screen-like conveyor which is supported by a continuous filtering web by continuously reacting a solution of sodium aluminate with a solution of sodium silicate, continuously pressing the gel at a predetermined time after the two solutions have been mixed, further dehydrating the mineral to a satisfactory moisture content by drying while it is still on the screen like conveyor, and dislodging it from the screen conveyor.

3. The method of producing siliceous base-exchange substances consisting in continuously forming a thin sheet of hydrated alumino-silicate gel around a screen-like conveyor which is supported by a continuous filtering web by continuously reacting a solution of sodium aluminate with a solution of sodium silicate, continuously pressing the gel at a predetermined time after the two solutions have been mixed, removing a part of the excess moisture remaining after pressing by drying, dislodging the mineral from the conveyor, and further dehydrating to a satisfactory moisture content by drying.

4. The method of producing siliceous base-exchange substances consisting in continuously forming a thin sheet of hydrated alumino-silicate gel around a screen-like conveyor which is supported by a continuous filtering web by continuously reacting a solution of sodium aluminate with a solution of sodium silicate, continuously pressing the gel at a predetermined time after the two solutions have been mixed, washing the partially dehydrated mineral and further dehydrating to a satisfactory moisture content by drying while it is still on the screen-like conveyor, and dislodging it from the screen conveyor.

RICHARD ERNEST BENSON.